United States Patent [19]

Ohashi et al.

[11] Patent Number: 5,283,146

[45] Date of Patent: Feb. 1, 1994

[54] PHOTOCONDUCTIVE PHTHALOCYANINE COMPOSITION

[75] Inventors: Toyoshi Ohashi; Toshiaki Ishibashi; Junko Gouda; Akira Itsubo; Toshiyuki Koyama; Masatomi Ozawa; Katsutosi Iijima, all of Ibaraki, Japan

[73] Assignee: Mitsubishi Petrochemical Co., Ltd., Tokyo, Japan

[21] Appl. No.: 905,309

[22] Filed: Jun. 29, 1992

[30] Foreign Application Priority Data

Jul. 22, 1991 [JP] Japan .................................. 3-204561
Sep. 13, 1991 [JP] Japan .................................. 3-261277

[51] Int. Cl.$^5$ .............................................. G03G 5/00
[52] U.S. Cl. .................................... 430/78; 430/56
[58] Field of Search .................................... 430/56, 78

[56] References Cited

FOREIGN PATENT DOCUMENTS 57-148745 9/1982 Japan .

OTHER PUBLICATIONS

CAS-Abstract-JP-57-148,745 "Integral Unit Electrophotographic Photoreceptor".
Bull. Soc. Chim. France, (1982): 23-26.

Primary Examiner—John Kight, III
Assistant Examiner—T. Mosley
Attorney, Agent, or Firm—Oblon, Spivak, McClelland, Maier & Neustadt

[57] ABSTRACT

A photoconductive phthalocyanine composition is disclosed, comprising (A) a photoconductive phthalocyanine composition comprising 100 parts by weight of an unsubstituted phthalocyanine derivative and from 0.001 to 5 parts by weight of a nitro- or halogen-substituted phthalocyanine derivative and (B) from 0.01 to 10 parts by weight, per 100 parts by weight of the photoconductive phthalocyanine composition (A), of a phthalocyanine derivative having at least 4 electron attracting groups. A photosensitive layer formed of the photoconductive phthalocyanine composition produces digital signals whether input light is digital or not. It is useful as not only a photoreceptor for digital recording system of electrophotography but a photoreceptor for analogue light input in conventional PPC to provide a high quality image with sharp edges.

15 Claims, No Drawings

PHOTOCONDUCTIVE PHTHALOCYANINE COMPOSITION

FIELD OF THE INVENTION

This invention relates to a phthalocyanine composition which is useful as an electrophotographic photoreceptor for digital signal input.

BACKGROUND OF THE INVENTION

Conventional electrophotographic photoreceptors include those which are close to a simple photoconductor, so-called Carlson's photoreceptors, those having an amorphous Se photosensitive layer, those having an amorphous Si layer, and ZnO-resin photoconductors which are similar to an amorphous Se layer. A photosensitive layer of separate function type using an organic semi-conductor has recently been put to practical use. Any of these electrophotographic techniques has been developed based on the conception of an analogue recording system in which a photoconductive material passing a photoelectric current in proportion to the amount of incident light is employed.

Electrophotographic techniques and computer communication techniques have recently been combined, and a printer or facsimile system has rapidly been introduced into an electrophotographic recording system. Accordingly, it has been demanded to displace the conventional analogue recording system for plain paper copiers (PPC) with a digital recording system in the field of electrophotography. For example, JP-A-1-169454 (corresponding to U.S. Pat. No. 4,963,452) (the term "JP-A" as used herein means an "unexamined published Japanese patent application") discloses the concept of a photoreceptor for digital light input. However, the publication affords no specific description about the materials of the photoreceptor for digital light input.

SUMMARY OF THE INVENTION

An object of the present invention is to provide a photoconductive phthalocyanine composition which observes a digital behavior against incident light as required in digital computers or copying machines for information processing or image processing.

The present invention relates to a photoconductive phthalocyanine composition comprising a photoconductive phthalocyanine composition comprising 100 parts by weight of a compound represented by formula (I):

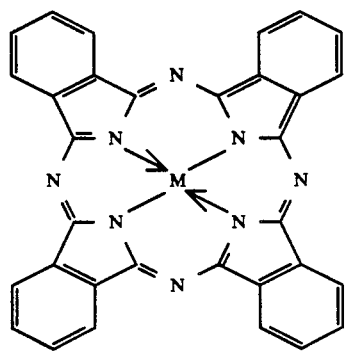

wherein M represents a hydrogen atom or an atom or compound residue capable of covalent bonding or coordinate bonding to phthalocyanine, and from 0.001 to 5 parts by weight of a compound represented by formula (II):

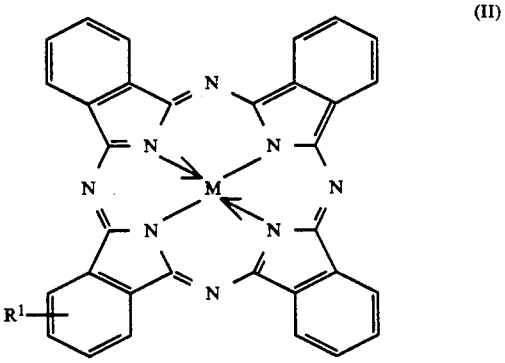

wherein M is as defined above; and R represents a nitro group or a halogen atom, and from 0.01 to 10 parts by weight, per 100 parts by weight of the photoconductive phthalocyanine composition, of a phthalocyanine derivative represented by formula (III):

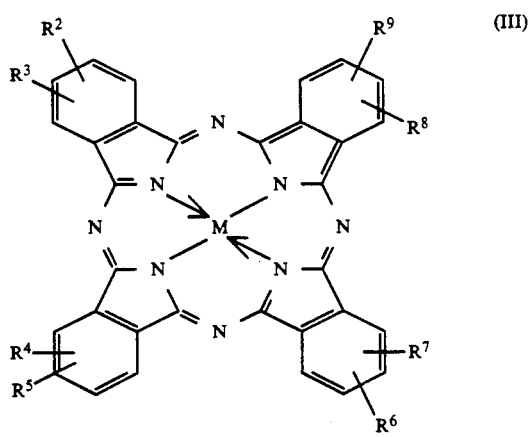

wherein M is as defined above; and $R^2$, $R^3$, $R^4$, $R^5$, $R^6$, $R^7$, $R^8$, and $R^9$, which may be the same or different, each represents a hydrogen atom or an electron attracting group, provided that at least four of them each represents an electron attracting group.

DETAILED DESCRIPTION OF THE INVENTION

In formulae (I) to (III), M includes a hydrogen atom, magnesium, calcium, zinc, aluminum, titanium, tin, lead, vanadium, iron, cobalt, nickel, copper, silicon, and a residue of an oxide or halide of these metals. Preferred of them are a hydrogen atom, copper, cobalt, lead, nickel, magnesium, titanyl, and vanadyl, with a hydrogen atom, copper, magnesium, titanyl, and vanadyl being more preferred.

In formula (II), $R^1$ preferably represents a nitro group, a chlorine atom, a bromine atom, or a fluorine atom, with a nitro group and a chlorine atom being more preferred.

The photoconductive phthalocyanine composition comprising the compound of formula (I) and the compound of formula (II) (hereinafter referred to as phthalocyanine composition (1)) comprises 100 parts by weight of the former compound and from 0.001 to 5 parts by weight, preferably from 0.001 to 3 parts by weight, of the latter compound.

While phthalocyanine composition (1) may be obtained by mixing the two compounds, it is generally prepared by simultaneously synthesizing the two compounds by starting with a compound capable of forming a phthalocyanine ring (hereinafter referred to as compound A) and a compound of the same structure as compound A but having a nitro or halogen substituent (hereinafter referred to as compound B) as described in Moser, F. H. et al, *The Phthalocyanine*, CRC Press (Boca Raton) (1983). In this case, compound B is used in an amount of from 0.001 to 5 parts by weight, and preferably from 0.001 to 3 parts by weight, per 100 parts by weight of compound A. The process for synthesizing composition (1) from compounds A and B is not limited as far as the weight ratio of the starting compounds falls within the above range. For example, organic compounds capable of forming a phthalocyanine ring and auxiliaries necessary for phthalocyanine synthesis, i.e., a catalyst, a metallic salt or a hydrogen donor, and a nitrogen donor, e.g., urea, are heated in an inert solvent while stirring.

Examples of the organic compound capable of forming a phthalocyanine ring include phthalic acid, phthalic anhydride, phthalamide, phthalic acid monoamide, phthalimide, orthocyanobenzamide, phthalodinitrile, aminoiminoisoindolenine, and polyaminoiminoisoindolenine. A hydrogen donor, e.g., cyclohexylamine, is used in the preparation of a metal-free phthalocyanine, and a metallic salt, e.g., cuprous chloride, is used in the preparation of a metallophthalocyanine. Where in using an organic compound lacking a nitrogen atom necessary for forming an azaphorphine nucleus, such as phthalic acid, the reaction is carried out in the presence of a catalyst, e.g., ammonium molybdate, and a nitrogen donor, e.g., urea.

In formula (III), the electron attracting group as represented by $R^2$, $R^3$, $R^4$, $R^5$, $R^6$, $R^7$, $R^8$, or $R^9$ shows a positive value of the substituent constant $\sigma$ in Hammett's rule, and it preferably shows the substituent constant $\sigma$ more than $+0.2$. Examples of the electron attracting group include a nitro group, a cyano group, a halogen atom, a sulfo group, and a carboxyl group, with a nitro group, a cyano group, and a halogen atom being preferred. More preferred of them are a nitro group and a halogen atom. The compound of formula (III) preferably carries 4 to 8, and especially 4 to 6, electron attracting groups per molecule.

The photoconductive phthalocyanine composition according to the present invention (hereinafter referred to as phthalocyanine composition (2)) comprises 100 parts by weight of phthalocyanine composition (1) and from 0.01 to 10 parts by weight, and preferably from 0.1 to 5 parts by weight, of the compound of formula (III).

Phthalocyanine composition (2) may be prepared by incorporating the compound of formula (III) into the above-described reaction system for synthesizing phthalocyanine composition (1) or by subjecting phthalocyanine composition (1) and the compound of formula (III) to pigment processing (cf., Funatsu, Kameyama, Senryo to Yakuhin, 23 (10), 210 (1978), and ibid., 23 (11), 221 (1978)). The pigment processing includes (i) an acid pasting process or an acid slurry process in which phthalocyanine is once dissolved in an acid, and re-precipitated in a poor solvent, e.g., water, or by addition of a basic substance and (ii) a milling process in which phthalocyanine is mechanically ground in a ball mill, an attritor, or a kneader.

Where composition (2) is prepared by the former method, i.e., simultaneous synthesis, the compound of formula (III) is added in an amount of from 0.01 to 5 parts by weight, and preferably from 0.1 to 5 parts by weight, per 100 parts by weight of the sum of compounds A and B.

Phthalocyanine composition (1) or (2) thus obtained varies in crystal form, crystal grain distribution or crystal size depending on the history through the preparation process. When the resulting composition is coated to form a photosensitive film, such variations may cause film defects, for example, non-uniformity, and some crystal forms may interfere with the specific passage of photoelectric current hereinafter described. Therefore, the composition is preferably subjected to the above-described pigment processing so as to have a regulated crystal system.

Where composition (2) is prepared by the latter method, i.e., pigment processing, the compound of formula (III) is used in an amount of from 0.01 to 10 parts by weight, and preferably from 0.1 to 5 parts by weight, per 100 parts by weight of phthalocyanine composition (1). As compared with phthalocyanine composition (1), phthalocyanine composition (2) has a smaller light energy $E_1$ indicative of photosensitivity (for the details see Examples hereinafter given), that is, higher sensitivity.

The pigment processing consists of dissolving phthalocyanine composition (1) or phthalocyanine composition (2) in an acid, and re-precipitating the composition in a poor solvent, e.g., water. Examples of the acid include inorganic acids, e.g., sulfuric acid, chlorosulfonic acid, and pyrophosphoric acid; and organic acids, e.g., methanesulfonic acid, ethanesulfonic acid, trifluoromethylsulfonic acid, and an alkylbenzenesulfonic acid. Preferred of them are sulfuric acid and methanesulfonic acid, with methanesulfonic acid being more preferred. The acid is preferably used in an amount of from 5 to 30 parts by weight, and more preferably from 10 to 20 parts by weight, per part by weight of the phthalocyanine composition. The poor solvent is not particularly limited as long as phthalocyanine is insoluble therein. Examples of suitable poor solvents are water, methanol, ethanol, acetone, and methyl ethyl ketone. The poor solvent is preferably used in an amount of 3 to 30 times, and more preferably from 5 to 15 times, the volume of the acid used. The re-precipitated phthalocyanine composition can be isolated.

For use as an electrophotographic photoreceptor, the phthalocyanine composition according to the present invention is uniformly dispersed together with binder resins, a solvent, etc. in a kneading or dispersing machine, e.g., a ball mill or an attritor, to prepare a coating composition.

Examples of suitable binder resins include insulating resins having a volume resistivity of $10^7$ $\Omega$cm or more, such as melamine resins, epoxy resins, silicone resins, polyurethane resins, polyester resins, alkyd resins, acrylic resins, xylene resins, vinyl chloride-vinyl acetate copolymer resins, polycarbonate resins, and cellulose derivatives; and photoconductive resins, such as polyvinylcarbazole.

If desired, the viscosity of the coating composition is adjusted by addition of any solvent. The resulting coating composition is coated on a conductive support to provide a photoreceptor comprising a conductive support having formed thereon a photosensitive layer.

The conductive support is selected from those commonly employed in electrophotographic photoreceptors, such as an aluminum plate and a paper sheet or plastic film having been rendered electrically conductive. Coating can be carried out by means of an air doctor coater, a blade coater, a rod coater, a reverse roll coater, a spray coater, a hot coater, a squeeze coater, or a gravure coater. After being coated, the coating film is properly dried so as to exhibit sufficient chargeability as a photoconductive layer.

The photoreceptor according to the present invention has a resin to photoconductive material weight ratio of 1 or more. The resin proportion is higher than in photoreceptors using, for example, zinc oxide as a photoconductive material. Therefore, the photoreceptor has sufficient physical strength while exhibiting satisfactory flexibility. Additionally, it has other excellent characteristics advantageous for practical use, such as good adhesion between the conductive support and the photosensitive layer, satisfactory moisture resistance, less liability to variation in performance with time, freedom from toxicity, ease in preparation, and low cost of preparation.

Unlike the conventional photoreceptors, the photoreceptor of the present invention allows photoelectric current to pass therethrough in a specific way so that it finds use as the one for digital light input. Specifically, the conventional photoreceptors pass a photoelectric current of an amount proportional to the amount of input light, whereas the one of the present invention passes no or little photoelectricity up to a certain level of input light but, immediately after the amount of input light exceeds that level, suddenly allows passage of photoelectricity.

Since digital recording accomplishes display of image gradation through changes of dot area, it is desirable that the photoreceptor to be used in this recording system has the above-described photosensitivity. This is because even if a laser spot is precisely modulated by means of an optical system, distribution of the amount of the light of the spot itself or formation of a halo cannot be avoided in principle. According to the conventional photoreceptors which catch the changes of light energy (amount of input light) in steps, the dot pattern changes with the changes in amount of light, causing fog as a noise. The phthalocyanine composition of the present invention is thus advantageous as a photoreceptor for digital light input.

The present invention is now illustrated in greater detail with reference to examples, but it should be understood that the present invention is not construed as being limited thereto. All the percents and parts are by weight unless otherwise indicated.

EXAMPLE 1

A mixture of 0.18 part of 4-nitrophthalic anhydride, 18 parts of phthalic anhydride, 31 parts of urea, 5.1 parts of cupric chloride, 0.2 part of ammonium molybdate, and 150 parts of nitrobenzene was heated at 190° C. for 5 hours with stirring, followed by filtration. The filtrate was thoroughly washed with methanol, boiled in 1000 parts of a 1N hydrochloric acid aqueous solution for 1 hour, and filtered while hot. The filtrate was washed with a sufficient amount of water until the filtrate became neutral and again boiled in 1000 parts of a 1N sodium hydroxide aqueous solution for 1 hour. Immediately thereafter, the mixture was filtered while hot, and the filtrate was washed with a sufficient amount of water until the filtrate became neutral and then dried at 110° C. to obtain 14 parts of a phthalocyanine composition (hereinafter designated phthalocyanine composition (A)).

Separately, a mixture of 23 parts of 4-nitrophthalic anhydride, 31 parts of urea, 5.1 parts of cupric chloride, 0.2 part of ammonium molybdate, and 150 parts of nitrobenzene was heated at 190° C. for 5 hours with stirring. The reaction mixture was worked up in the same manner as for phthalocyanine composition (A) to obtain 21.2 parts of tetranitrophthalocyanine.

Ten parts of phthalocyanine composition (A) and 0.2 part of the above prepared tetranitrophthalocyanine were dissolved in 100 parts of methanesulfonic acid, and the solution was added dropwise to ice-water (110 parts of water and 410 parts of ice). The precipitate thus formed was washed with a sufficient amount of water until the filtrate became neutral and then dried at 110° C. to obtain 9.5 parts of a phthalocyanine composition.

EXAMPLE 2

The same procedure for synthesizing phthalocyanine composition (A) of Example 1 was repeated, except for replacing 4-nitrophthalic anhydride with 0.02 part of 4-chlorophthalic anhydride, to obtain 14 parts of a phthalocyanine composition (hereinafter designated phthalocyanine composition (B)).

Ten parts of phthalocyanine composition (B) and 0.2 part of tetranitrophthalocyanine prepared in Example 1 were dissolved in 100 parts of 98% sulfuric acid, and the solution was added dropwise to ice-water (110 parts of water and 410 parts of ice). The precipitate thus formed was worked up in the same manner as in Example 1 to obtain 9.5 parts of a phthalocyanine composition.

EXAMPLE 3

A mixture of 0.20 part of 4-nitrophthalic anhydride, 18 parts of phthalic anhydride, 31 parts of urea, 5.1 parts of cupric chloride, 0.2 part of ammonium molybdate, 3 parts of tetranitrophthalocyanine, and 150 parts of dodecylbenzene was heated at 180° C. for 5 hours while stirring. The reaction mixture was worked up in the same manner as for phthalocyanine composition (A) of Example 1 to obtain 18 parts of a phthalocyanine composition.

The resulting composition was treated with methanesulfonic acid in the same manner as in Example 1 to obtain a phthalocyanine composition.

EXAMPLE 4

Ten parts of phthalocyanine composition (B) obtained in Example 2 and 0.1 part of octachlorophthalocyanine were dissolved in 100 parts of methanesulfonic acid, and the solution was worked up in the same manner as in Example 2 to obtain 10 parts of a phthalocyanine composition.

EXAMPLE 5

A mixture of 0.8 part of 3-chlorophthalonitrile, 29 parts of phthalonitrile, 3 parts of cyclohexylamine, and 100 parts of nitrobenzene was allowed to react and worked up in the same manner as for phthalocyanine composition (A) of Example 1 to prepare a phthalocyanine composition.

Separately, tetrachlorophthalocyanine was prepared from 29 parts of 4-chlorophthalonitrile, 3 parts of cyclohexylamine, and 100 parts of nitrobenzene in the same manner as in Example 1.

Ten parts of the above prepared phthalocyanine composition and 0.1 part of the above prepared tetrachlorophthalocyanine were treated with methanesulfonic acid in the same manner as in Example 1 to obtain a phthalocyanine composition.

Each of the phthalocyanine compositions prepared in Examples 1 to 5 was analyzed by FD-mass spectrometry, and the proportions of the compound of formula (I), the compound of formula (II), and the compound of formula (III) constituting each composition were obtained by a calibration curve method using the parent peak of the spectrum. The results obtained are shown in Table 1 below.

TABLE 1

| Example No. | Compound (I) (part) | Compound (II) (part) | Compound (III) (part) |
|---|---|---|---|
| 1 | 100 | 0.6 | 2.0 |
| 2 | 100 | 0.1 | 2.0 |
| 3 | 100 | 0.6 | 3.2 |
| 4 | 100 | 0.6 | 1.0 |
| 5 | 100 | 0.5 | 1.0 |

COMPARATIVE EXAMPLE 1

Unsubstituted phthalocyanine was treated with methanesulfonic acid in the same manner as in Example 1.

COMPARATIVE EXAMPLE 2

Ten parts of unsubstituted phthalocyanine and 0.2 part of tetranitrophthalocyanine were treated with methanesulfonic acid in the same manner as in Example 1 to obtain a phthalocyanine composition.

APPLICATION EXAMPLE

A photoreceptor was produced as follows by using each of the phthalocyanine compositions prepared in Examples 1 to 5 and Comparative Examples 1 and 2.

A mixture of 0.8 part of each phthalocyanine composition, 2.8 parts of a polyester resin solution ("ALMATEX P645" produced by Mitsui Toatsu Chemicals Inc.), 1 part of a melamine resin ("UVAN 20HS" produced by Mitsui Toatsu Chemicals Inc.), and 14 parts of cyclohexanone was dispersed together with 30 parts of glass beads in a paint mixer for 4 hours to prepare a coating composition. The coating composition was coated on a 90 μm thick aluminum foil to a dry thickness of 15 μm and dried at 200° C. for 3 hours.

Photosensitive characteristics of the resulting photoreceptor were evaluated as follows by means of a testing apparatus "CYNTHIA 55" manufactured by GENTEC Co.

The photoreceptor was charged to +6.0 kV by corona discharge. The surface potential of the photoreceptor was measured with time, and the time (sec) at the knee where the surface potential abruptly fell was taken as a dark decay time.

Monochromatic light having a wavelength of 780 nm and a varied intensity was irradiated onto each photoreceptor charged to prepare a light decay curve (surface potential vs. exposure time) for every light intensity. The surface potential at the exposure time of 0.5 second was plotted against light energy to obtain the maximum of the light energy ($E_1$) with which the surface potential was maintained on substantially the same level as the initial surface potential and the minimum of the light energy ($E_2$) with which the surface potential was reduced to around the residual potential (about 30 V). The smaller the $E_1$ value, the higher the photosensitivity. The smaller the $E_2-E_1$ difference ($\Delta E$), the more suitable for digital input. According to this method of evaluation, photoreceptors having $\Delta E$ of not more than 20 μJ/cm$^2$ are regarded capable of digital recording, and those having higher $\Delta E$ ar regarded to be for analogue recording. The results obtained are shown in Table 2. In Comparative Examples 1 and 2, since the dark decay curve revealed no knee, the time (sec) required for the initial surface potential to be reduced by half was measured.

TABLE 2

| Example No. | Dark Decay Time (sec) | $E_1$ (μJ/cm$^2$) | $E_2$ (μJ/cm$^2$) | $\Delta E$ | Residual Potential (V) |
|---|---|---|---|---|---|
| Example 1 | 80 | 2.0 | 3.4 | 1.4 | 10 |
| Example 2 | 40 | 2.4 | 5.2 | 2.8 | 15 |
| Example 3 | 70 | 3.0 | 6.0 | 3.0 | 17 |
| Example 4 | 45 | 2.9 | 6.3 | 3.4 | 18 |
| Example 5 | 90 | 3.8 | 7.0 | 3.2 | 20 |
| Compara. Example 1 | 60 | 0.15 | 100 | 99.85 | 200 |
| Compara. Example 2 | | 0.1 | 27.5 | 27.40 | 30 |

As described above, the phthalocyanine composition according to the present invention provides, with the aid of an insulating binder resin, a photosensitive layer which shows a specific flow of photoelectric current upon light input to produce digital signals whether the input light is analogue light or digital light. Accordingly, the photoconductive phthalocyanine composition of the present invention is useful for electrophotography of digital recording system. It is also applicable to photoreceptors for analogue light input in conventional PPC to provide a high quality image with sharp edges.

While the invention has been described in detail and with reference to specific examples thereof, it will be apparent to one skilled in the art that various changes and modifications can be made therein without departing from the spirit and scope thereof.

What is claimed is:

1. A photoconductive phthalocyanine composition comprising (A) a photoconductive phthalocyanine composition comprising 100 parts by weight of a compound represented by formula (I):

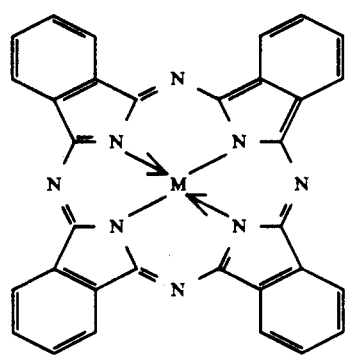

(I)

wherein M represents a hydrogen atom or an atom or compound residue capable of covalent bonding or coordinate bonding to phthalocyanine, and from 0.001 to 5 parts by weight of a compound represented by formula (II):

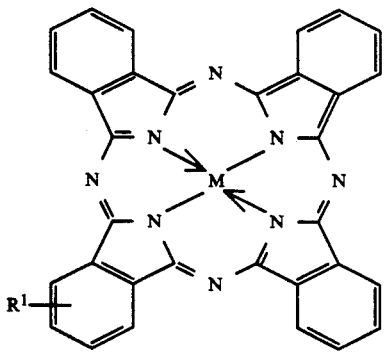
(II)

wherein M is as defined above; and $R^1$ represents a nitro group or a halogen atom,
and (B) from 0.01 to 10 parts by weight, per 100 parts by weight of the photoconductive phthalocyanine composition (A), of a phthalocyanine derivative represented by formula (III):

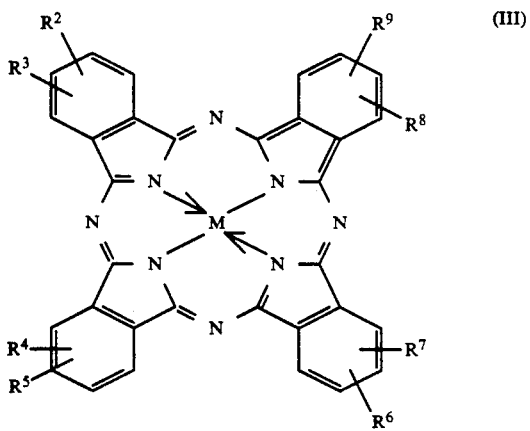
(III)

wherein M is as defined above; and $R^2$, $R^3$, $R^4$, $R^5$, $R^6$, $R^7$, $R^8$, and $R^9$, which may be the same or different, each represents a hydrogen atom or an electron attracting group, provided that at least four of them each represents an electron attracting group.

2. The photoconductive phthalocyanine composition as claimed in claim 1, wherein M represents a hydrogen atom, magnesium, calcium, zinc, aluminum, titanium, tin, lead, vanadium, iron, cobalt, nickel, copper, silicon, or a residue of an oxide or halide of these metals.

3. The photoconductive phthalocyanine composition as claimed in claim 2, wherein M represents a hydrogen atom, copper, cobalt, lead, nickel, magnesium, titanyl, or vanadyl.

4. The photoconductive phthalocyanine composition as claimed in claim 3, wherein M represents a hydrogen atom, copper, magnesium, titanyl, or vanadyl.

5. The photoconductive phthalocyanine composition as claimed in claim 1, wherein $R^1$ represents a nitro group, a chlorine atom, a bromine atom, or a fluorine atom.

6. The photoconductive phthalocyanine composition as claimed in claim 5, wherein $R^1$ represents a nitro group or a chlorine atom.

7. The photoconductive phthalocyanine composition as claimed in claim 1, wherein the photoconductive phthalocyanine composition (A) comprises 100 parts by weight of the compound of formula (I) and from 0.001 to 3 parts by weight of the compound of formula (II).

8. The photoconductive phthalocyanine composition as claimed in claim 1, wherein the electron attracting group as represented by $R^2$, $R^3$, $R^4$, $R^5$, $R^6$, $R^7$, $R^8$, or $R^9$ shows a positive value of the substituent constant $\sigma$ in Hammett's rule.

9. The photoconductive phthalocyanine composition as claimed in claim 8, wherein the electron attracting group shows the substituent constant $\sigma$ more than $+0.2$.

10. The photoconductive phthalocyanine composition as claimed in claim 1, wherein the electron attracting group as represented by $R^2$, $R^3$, $R^4$, $R^5$, $R^6$, $R^7$, $R^8$, or $R^9$ represents a nitro group, a cyano group, a halogen atom, a sulfo group, or a carboxyl group.

11. The photoconductive phthalocyanine composition as claimed in claim 10, wherein the electron attracting group represents a nitro group, a cyano group, or a halogen atom.

12. The photoconductive phthalocyanine composition as claimed in claim 11, wherein the electron attracting group represents a nitro group or a halogen atom.

13. The photoconductive phthalocyanine composition as claimed in claim 1, wherein the compound of formula (III) carries 4 to 8 electron attracting groups per molecule.

14. The photoconductive phthalocyanine composition as claimed in claim 13, wherein the compound of formula (III) carries 4 to 6 electron attracting groups per molecule.

15. The photoconductive phthalocyanine composition as claimed in claim 1, wherein the photoconductive phthalocyanine composition comprises 100 parts by weight of the phthalocyanine composition (A) and from 0.1 to 5 parts by weight of the compound of formula (III).

* * * * *